United States Patent
Kearfott

(10) Patent No.: US 7,405,409 B2
(45) Date of Patent: Jul. 29, 2008

(54) NEUTRON IRRADIATIVE METHODS AND SYSTEMS

(75) Inventor: Kimberlee Jane Kearfott, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 19 days.

(21) Appl. No.: 11/357,874

(22) Filed: Feb. 17, 2006

(65) Prior Publication Data

US 2008/0156997 A1 Jul. 3, 2008

Related U.S. Application Data

(60) Provisional application No. 60/654,845, filed on Feb. 18, 2005.

(51) Int. Cl.
*G01N 23/00* (2006.01)
(52) U.S. Cl. .................................. 250/390.04
(58) Field of Classification Search ............. 250/390.04
See application file for complete search history.

(56) References Cited

U.S. PATENT DOCUMENTS

| | | | |
|---|---|---|---|
| 4,864,142 A | 9/1989 | Gomberg | |
| 4,918,315 A | 4/1990 | Gomberg et al. | |
| 5,142,153 A | 8/1992 | Gomberg | |
| 5,440,136 A | 8/1995 | Gomberg | |
| 2005/0012044 A1* | 1/2005 | Tadokoro et al. | 250/363.01 |

* cited by examiner

*Primary Examiner*—David P. Porta
*Assistant Examiner*—Marcus H Taningco
(74) *Attorney, Agent, or Firm*—Harness, Dickey & Pierce, P.L.C.

(57) ABSTRACT

A neutron elastic scattering detector device for non-invasively detecting the presence of at least one predetermined element of an object of interest. The detector device comprises a neutron source that simultaneously outputs, at a creation time, a neutron in a first direction and an associated baseline particle in a second direction. The first direction is opposite of the second direction. The neutron can impinge upon the predetermined element of the object of interest and scatter therefrom in a third direction. A baseline particle detector system detects the baseline particle and outputs a baseline signal characteristic thereof. A neutron detector system detects the neutron and outputs a scattering signal in characteristic thereof. The processing unit analyzes the baseline signal and the scattering signal to determine the presence of the predetermined element.

30 Claims, 7 Drawing Sheets

NEUTRON IRRADIATIVE METHODS AND SYSTEMS

CROSS-REFERENCE TO RELATED APPLICATIONS

This application claims the benefit of U.S. Provisional Application No. 60/654,845, filed on Feb. 18, 2005. The disclosure of the above application is incorporated herein by reference.

FIELD

The present disclosure relates to methods and systems for identifying chemical composition of materials and, more particularly, relates to methods and systems for identifying chemical composition of materials through analysis of the energy and direction of elastically scattered neutrons.

BACKGROUND AND SUMMARY

The statements in this section merely provide background information related to the present disclosure and may not constitute prior art.

Recently, there has been an increasing need to permit the quick, non-invasive, non-destructive analysis of the chemical compositions of materials, especially when such materials are concealed, such as illicit materials or explosives, or otherwise spaced a considerable distance from the detection system, such as to improve personnel safety in the event of an explosion. That is, there exists a need for a rapid, non-visual, reliable, sensitive, low false-alarm rate detection process. Such a detection process can be particularly useful in the examination of transport items, such as by non-limiting example envelopes, parcels, luggage, trucks, or shipping containers. Such a detection process could also be particularly useful in the detection of explosives, biological weapons, or other materials concealed in the natural environment, such as antipersonnel or other types of land mines, explosives concealed in vehicles, and additionally useful in the non-invasive examination of munitions for use in determining appropriate deactivation procedures.

Magnetic inspection techniques can be useful for detecting metallic articles, such as weapons, but non-metallic articles such as explosives or narcotics are not detectable by such methods. Furthermore, explosives and narcotics, as a general rule, do not have readily distinguishable ionizing photon (X-ray or gamma ray) absorption characteristics, unless examined using low energy photons. However, the use of low energy photons limits such examination to smaller objects and, thus, may prove difficult to distinguish contraband and normal items of commerce. Both magnetic and X-ray and ionizing photon methods may not provide sufficient functionality and/or reliability in the detection of many types of contraband.

Thermal neutron activation analysis (TNAA) is a conventional method for determining chemical composition that utilizes neutrons to interrogate both samples in the laboratory and in concealed spaces. In TNAA, a source, generally of relatively low energy neutrons, is used to bombard the sample object of interest. The nuclei of the atoms comprising the sample capture the bombarding neutrons and are rendered radioactive. When these newly radioactive isotopes undergo radioactive decay, they emit energetic photons (gamma rays) or particles characteristic of the newly radioactive nuclei. These emitted photons or particles are then detected using various means by which the energies of the photons and/or particles are measured and used to identify the elemental composition of the sample object. This approach is capable of identifying various elemental compositions, but its practical utility is largely confined to low volume, low throughput applications as in a laboratory environment due, in part, to the high rate of attenuation of the low energy neutrons. There is also a low interaction probability for thermal neutrons in low atomic number materials, so a very large number of neutrons are needed for identifying these. Furthermore, a very large number of the possible thermal neutron interactions result in the production of radioactive nuclei that have persistent radioactivity. The fundamental process thus requires that the sample be made radioactive and the induced activity of many common materials, particularly metals, persists well beyond the inspection period and thus can present a health hazard. Items in the environment near the sample may similarly become radioactive. Because the composition of the materials in the container or space being inspected is not known in advance, the total amount of induced radioactivity and how long the induced activity will be present is similarly unknown. The duration of the radioactivity of many benign inspected items may be quite long.

Furthermore, neutron activation analysis is not very efficient for detecting nitrogen or carbon, two of the major components of explosives and narcotics, because nitrogen or carbon each have small capture neutron cross-sections as compared to heavier elements and metals. If these light elements are to be activated with high enough probability to produce useful signals for identification, the incident neutron flux must be relatively high and thus capable of inducing significant radioactivity in other benign components of the objects of interest being inspected. The method is further very insensitive to oxygen, an important component of many explosives and narcotics. Many explosives detection methods rely only upon the detection of nitrogen, but the nitrogen to oxygen ratio may be a significant indication of the presence of explosives and/or narcotics in an object.

While the discussion above describes the use of thermal neutrons (typically with energies below about 0.025 eV, the most probable energy) for activation analysis, higher energy (fast) neutrons may also be used. High energy neutrons have the potential advantage that they can penetrate further and thus may interrogate deeper into the interior of larger containers. In fact, their usage may be required for the interrogation of very large samples. Their use, however, suffers from the problems with persistence of lingering radioactivity in the object of interest and may pose other problems when the large neutron flux interacts with metals or heavy elements in the vicinity as described for methods using thermal neutrons described above. Furthermore, the capture cross-section for fast neutrons is often lower than for low energy neutrons and thus require an even higher incident neutron flux for reliable detection with low false alarm rates. Therefore, the target must be irradiated with large numbers of neutrons in order to get usable neutron activation data. This brings with it problems of unintended high flux neutron scattering that, for safety, requires substantially greater shielding, and thus a larger equipment footprint or personnel stand-off distances. It should also be understood that techniques employing neutrons having energies between those of fast and thermal suffer from some of the limitations of both techniques.

Inelastic neutron scattering (INS) is the process in which neutrons interact with the nuclei in object of interest producing an excited nuclear state, which then emit neutrons with a lower energy and gamma ray photons. In inelastic scatter the neutron induces an excited state in the target nucleus, which then "falls back" to its earlier energy by emitting a lower energy neutron and a gamma ray photon. Both the gamma ray photons and the neutrons have characteristic energies that, if measured, can identify the nuclei from which they were emitted. Inelastic scatter interactions do not make the target radioactive. Although there is a "delay" between when the neutron first interacts with the nucleus and when the gamma ray is emitted, this time is on the order of micro or nanoseconds, after which the target nucleus is returned to its previous state. The target may still be somewhat radioactive because a few of the source neutrons would be absorbed (as mentioned earlier) but this would not be as much of an issue as for absorption methods because inelastic scatter has a much higher interaction probability which would make it possible to have a much lower incident flux. Whenever neutrons are incident upon an object, especially objects containing lower atomic number materials, neutron elastic scattering also occurs with a very high probability. Inelastic neutron scattering methods do not use any information about object composition that arise from these very probable events. Thus methods using inelastic neutron scattering alone would require more neutrons to obtain the desired information than methods which use elastic scattering or a combination of elastic scattering with other processing. The persistent radioactivity and radiation hazards in INS would thus be higher than for methods taking advantage of neutron elastic scattering.

Neutron transmission analysis (NTA) has also been proposed for the inspection of closed containers. This approach uses neutrons in a similar fashion to ionizing photons to produce a "shadow" (transmission) image of the contents of a container. This method is identical to the way medical X-ray imaging works, except neutrons are used instead of X-ray photons. Neutrons are directed towards the object of interest and the transmitted (uninteracted) neutrons are detected on the far side by appropriately position sensitive detectors. Because some elements interact with neutrons much more strongly than others, the detected neutrons on the far side of the inspected object can cast an image whose intensity indicates the interactions with the object's components. This absorption may not be sufficiently specific to allow composition identification. A serious difficulty arises, however, because the absorption in elements other than the component elements of explosives and narcotics can be large and interfere with the detection process for the elements of interest. The high neutron fluxes required for adequate signal to noise to permit low false alarm rates again may generate radioactivity, as in TNAA, and thus the same safety hazard issues exist.

Another possible method for using neutrons to interrogate different targets is neutron elastic scatter (NES). NES has the highest interaction probability of any of the interactions discussed herein. In NES the incident neutron interacts by scattering off the target nucleus in a perfect elastic scatter. In these "billiard ball" calculations, the scattered neutron energy depends only on the incident neutron energy, the mass of the target nucleus, and the angle of scatter. Because this is the most likely type of neutron interaction for most materials (especially lighter ones), a smaller incident neutron flux can be used. This means that induced target radioactivity is minimized and thus there is less danger to personnel. This is the basis for the current application.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Neutron Elastic Scattering (NES)

According to the principles of the present teachings, methods and systems are provided for identifying chemical composition of materials and, more particularly, for identifying chemical composition of materials through analysis of the energy and direction of elastically scattered neutrons. The principles of these teachings are predicated, at least in part, on the fundamental process of neutron elastic scattering (NES), which is set forth in detail in U.S. Pat. Nos. 4,864,142; 4,918,315; 5,142,153; and 5,440,136, which are incorporated herein by reference.

Briefly, by way of introduction, the principles of the present teachings provide that the speed of a neutron is directly related to its energy. Because neutrons emitted from sources, such as neutron generators and some accelerator targets, are of known, single energies, the amount of time it takes for these neutrons to travel to a target nucleus in an object of interest is known. When a neutron scatters elastically by a given angle, the amount of energy it loses depends upon the size of target nucleus of object of interest (determined by element atomic number) from which it scattered.

If a detector is positioned to receive that scattered neutron and is capable of measuring energy, then the scattered energy will be known. Since the scattered energy is known, then the amount of time that the neutron took to travel from the scattering location to the detector should also be known. However, the detected energy and the total neutron travel time (time-of-flight) will not agree if the neutron is scattered more than once. Typically, this process provides its greatest benefits and application when the volume of the object of interest stimulated by the neuron source, and/or viewed by the neutron detector, is smaller.

The sum of the amount of time it took for the neutron to travel from the source to the scattering point and from the scattering point to the detector is the total amount of time elapsed since the emission of the neutron. This time can be measured if the time of emission of the neutron is known and the time of detection of the neutron is known. The neutron emission time can be determined if the source is quickly pulsed, or if a means of detecting the other products of the neutron production process is provided at the source. Finally, a comparison of the total travel time of the neutron from the source to the detector with the measured energy of the scattered neutron can be made. Neutrons whose time-of-flight and scattered energy do not agree (within a certain amount) at a given angle can be rejected as being multiply-scattered. This rejection can be done using either software or hardware.

Figure 1:
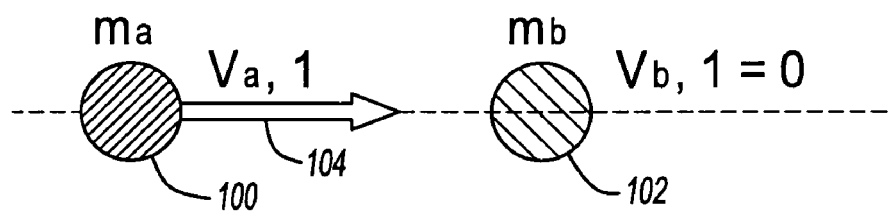
FIG. 1 is a schematic view illustrating an incident neutron prior to impacting a target nucleus.
Figure 2:
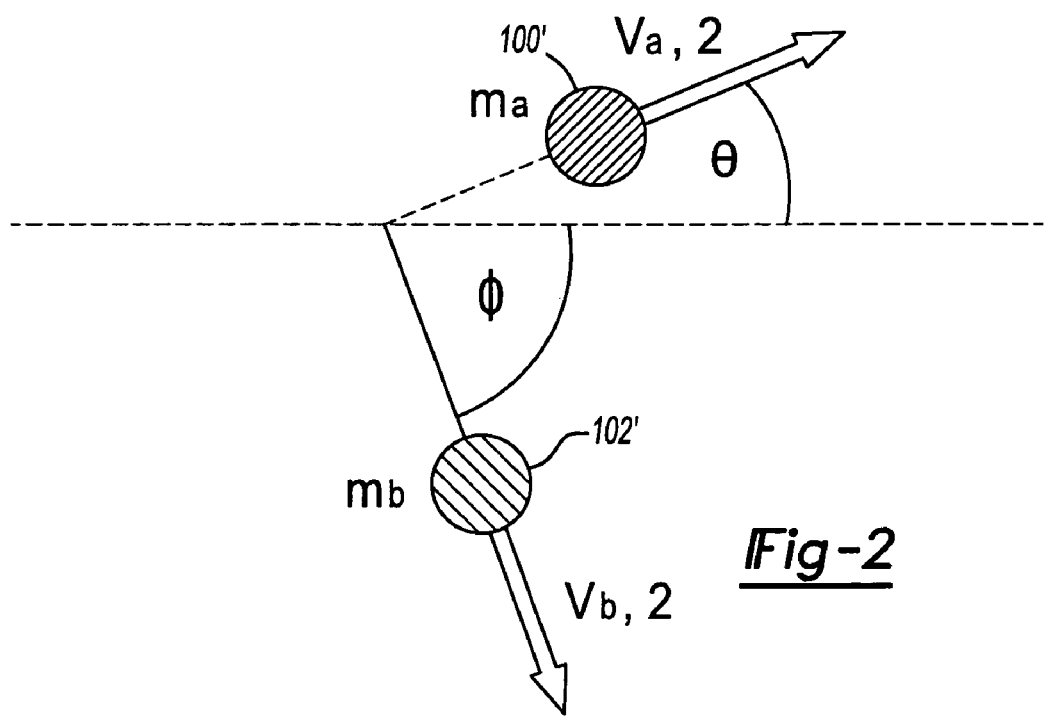
FIG. 2 is a schematic view illustrating the incident neutron and target nucleus of FIG. 1 following impact therebetween.

Therefore, referring to FIGS. 1 and 2, in some embodiments of the present teachings, neutron elastic scattering comprises an incident neutron 100, having a mass $m_a$ and velocity $V_{a1}$, impinges upon a target nucleus 102 in an object of interest 103 (see FIG. 3). Target nucleus 102 corresponds to a specific element having a given atomic number and mass $m_b$. Initially, target nucleus 102 can be at rest and, thus, have a velocity $V_{b1}$ equal to about zero. As illustrated in FIG. 2, in response to the impinging of incident neutron 100 upon target nucleus 102, scattered neutron 100' now defines a lower velocity $V_{a2}$ at a scattering angle θ (theta) relative to its incident neutron direction 104. Likewise, target nucleus 102' now defines a velocity $V_{b2}$ at an angle θ (phi) relative to incident neutron direction 104. In an elastic collision interaction, the energy of incident neutron 100 is shared between target nucleus 102' and scattered neutron 100', according to the requirements of conservation of momentum and energy. The relationship between the scattering angle θ (theta) and the energy at which scattered neutron 100' leaves is dependent upon the mass and energy of incident neutron 100 and the mass of scattered target nucleus 102'. It should be understood that the greatest loss of energy by incident neutron 100 during the scattering process will occur when scattered neutron 100' is scattered in a direction exactly opposite of incident neutron direction 104. However, generally, the above relationships hold for all scattering directions.

Accordingly, it should be appreciated that measurement of the energy lost and resultant direction of scattered neutron 100' enables mathematical identification of the mass of target nucleus 102 and thus of the isotopic mass thereof. Consequently, based on the foregoing, the chemical composition of target nucleus 102 can be determined.

In some embodiments of the present teachings, methods are provided that employ so called fast (high-energy) neutrons as the incident or probing neutron source. With methods currently in use, the elastically scattered neutrons are not detected or considered, and thus much information is thrown away. The total number of neutrons required for detection or specificity is thus increased for a given inspection situation, and a greater amount of induced radioactivity results. For some materials, fast neutrons induce less radioactivity by neutron absorption than thermal ones, so less activation per incident neutron may actually occur. In other materials, there are thresholds, or minimum energies, for which nuclear reactions which produce radioactivity occur, and thus higher energy neutrons may produce a greater amount of induced radiation than slower energy neutrons. However, in such cases the radiation produced will contain additional information about object composition than that derived using lower neutrons alone. If this information is obtained and utilized along with the information that arises from the neutron elastic scattering processes, fewer neutrons may be needed for object identification or characterization. All of these factors serve to minimize the induction of radioactivity by neutron absorption in the inspected material for the number of required neutrons for adequate examination.

Neutron Elastic Scattering Detector Device

Figure 3A:
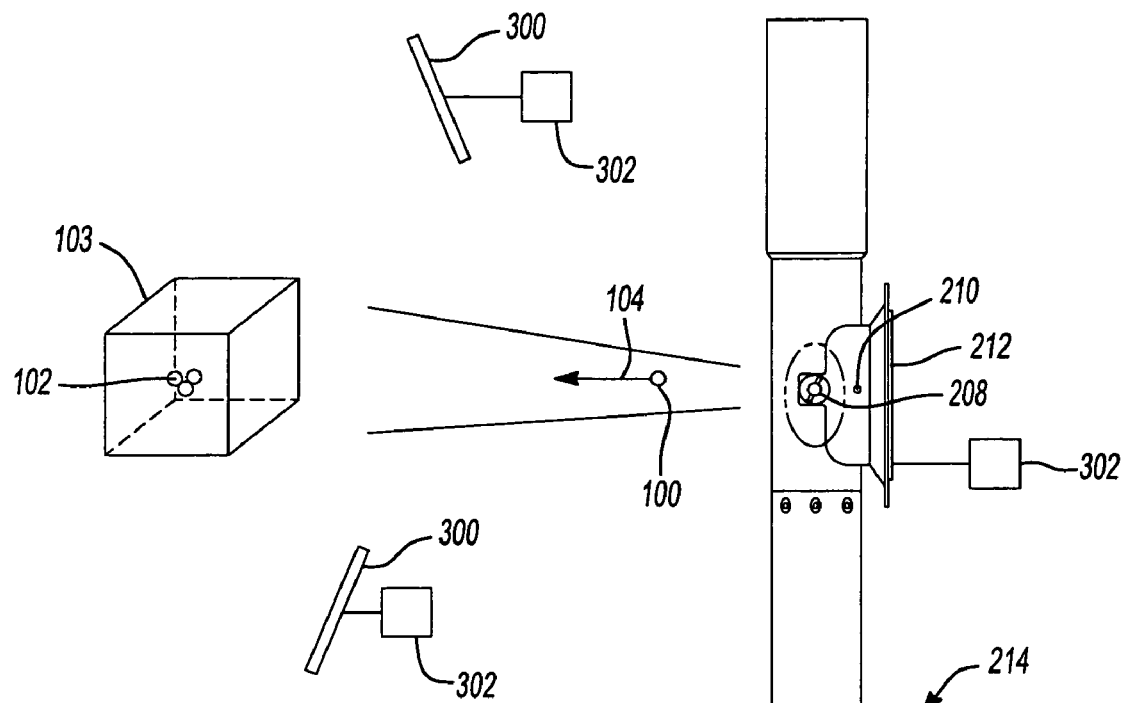
FIG. 3(a) is a schematic view illustrating a neutron elastic scattering detector device according to some embodiments of the present teachings.
Figure 3A:
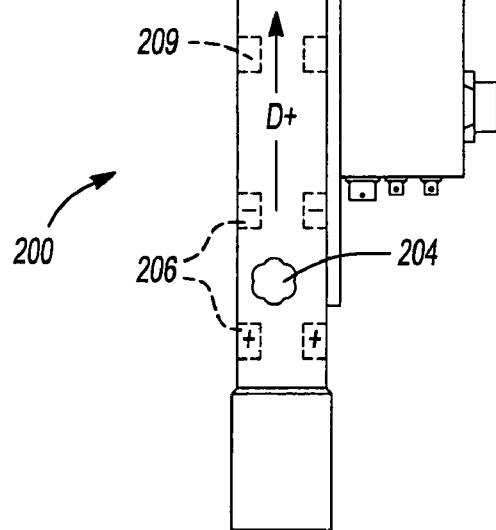
Figure 3B:
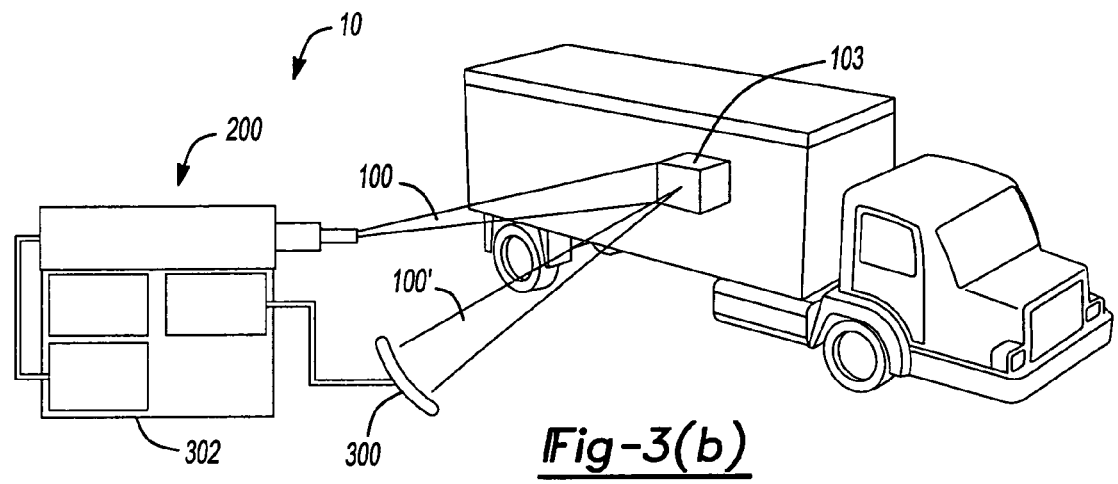
FIG. 3(b) is a schematic view illustrating a neutron elastic scattering detector device according to some embodiments of the present teachings.
Figure 3C:
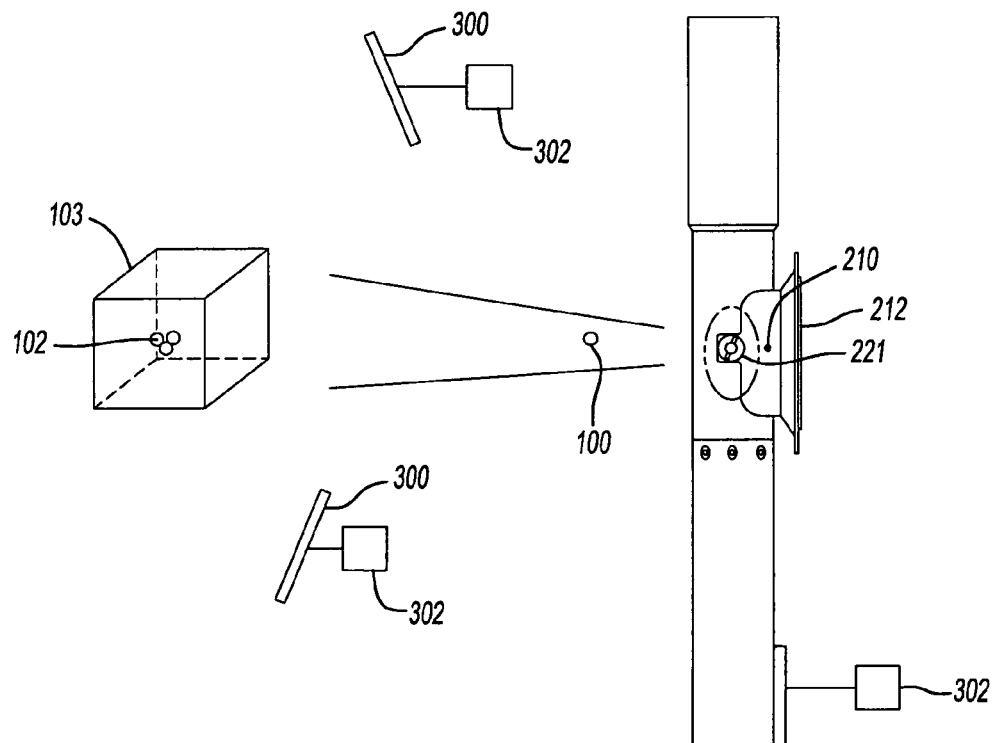
FIG. 3(c) is a schematic view illustrating a neutron elastic scattering detector device according to some embodiments of the present teachings.

In some embodiments, as illustrated in FIGS. 3(a)-(b), a neutron elastic scattering detector device 10 comprises a neutron source 200, at least one detector 300, and a data processing/control unit 302. As will be described in detail, neutron source 200 is operable to output and direct a plurality of incident neutrons 100 at object of interest 103. Some of these incident neutrons 100 will emerge in the direction of object of interest 103 and will interact with a group of target nuclei 102 contained therein. Other neutrons 100 will emerge at other angles and interact with other target nuclei 102, and processes similar to those now described will occur. The plurality of incident neutrons 100 impact or otherwise impinge upon target nuclei 102 contained within object of interest 103 and are scattered as scattered neutrons 100' in accordance with the principles of physics. Detector 300 detects scattered neutrons 100' and outputs a signal in response thereto to data processing unit and/or controller 302. Through analysis of such attributes as energy lost between incident neutron 100 and scattered neutron 100' and the resultant direction of scattered neutron 100', the mass of target nucleus 102 within object of interest 103 with which incident neutron 100 interacted can be determined. As this is repeated for many different target nuclei 102 in object of interest 103, a determination may be made of the relative numbers of nuclei of different atomic numbers. The composition of object of interest 103 can thus be readily determined.

In some embodiments of the present teachings, methods are provided for producing incident neutrons 100, directing incident neutrons 100 toward target nucleus 102 of object of interest 103, collecting scattered neutrons 100', and measuring their energy lost and/or time of arrival. Additionally, in some embodiments, the measurement of energy lost and/or time of arrival of neutron 100 is compared relative to the source emission time, and the change in direction of incident neutrons due to scattering to determine the identity and location of a specific nucleus in object of interest 103. In some embodiments, data attributes such as the energy difference between incident neutrons 100 and scattered neutrons 100', and the scattering angle θ (theta) are readily available when employing neutron elastic scattering detector device 10. However, in some embodiments, it is advantageous to reject information from scattered neutrons 100', if such scattered neutrons 100' have experienced more than one collision or scattering event prior to detection (hereinafter, generally referred to as multiply-scattered neutrons 100"). It should also be appreciated that in some embodiments, these data can be obtained using either a pulsed or a continuously-emitting neutron source 200.

In some embodiments, as will be discussed herein, a pulsed neutron source 200 can provide additional information by using source and detector arrival timing to characterize the energy of scattered neutrons 100' independently of a direct measurement of this energy with an energy sensitive detector element. The energy sensitivity of some detectors can be improved through the use of, for example, scintillation, semiconductor, gaseous, superheated liquids, or other materials whose electrical, optical, and/or pulse height output is energy dependent, multi-element detectors with one or more energy sensitive absorbers interposed between object of interest 103 and corresponding detectors 300, and the like. Detectors that are preferentially sensitive and/or have output signals specific to one or more specific energies are advantageous. One particular energy sensitive detector that can be used is the resonant detector described in U.S. Pat. No. 5,142,153, issued to Gomberg. It is also often necessary to have some electronics to reject signals from gamma rays that may interfere with the detection of the neutron signals. This may be done through a combination of circuitry, detector design, and/or software.

It should also be noted that performance of all neutron irradiative methods can be improved if larger numbers of incident neutrons (thus resulting in a larger number of scattered neutrons) are used. This is especially true for larger objects. Therefore, in some embodiments, a plurality of neutron sources 200 can be used, which can be arranged in an array. As will be discussed, shielding could also be use in conjunction with the plurality of neutron sources 200. Still further, in some embodiments, each of the plurality of neutron sources 200 can be pulsed independently or simultaneously to provide increased detection reliability. One important advantage of a plurality of neutron sources 200 is that object of interest 103 can be examined from different angles with minimal system or object motion. Alternatively, use of a single neutron source combined with controlled motion of the object of interest and correlation with the detector output may be used to obtain the benefits of varied angular perspectives. Because there is an angular dependence to the probability of elastic scattering that differs with the scattering nucleus type, observing object of interest 103 from different angles enhances the amount of information available. It further facilities the formation of images of chemical composition. The total neutron production rate is desired to be as high as possible; however individual neutron events must be resolvable in time through the use of sufficiently fast hardware and/or software data analysis.

For neutrons having different energies, the probability of interactions of different types with different nuclei changes. In some cases, certain absorption reactions are not possible unless the neutron has a particular minimal energy. The relative probability of neutron elastic scattering, and neutron elastic scattering as a function of angle, is a function of incident neutron energy. Using information from neutron interactions along with that from neutron elastic scattering interactions at different energies, at one or more angles, would enhance the total amount of information available to determine chemical composition or the presence of materials of interest. In some embodiments, two or more neutron sources emitting neutrons of different energies can be used, or a neutron source capable of supplying neutrons at two or more distinct energies could be utilized. Collecting information at different energies can provide more useful information about the composition of object of interest 103. Such neutron sources could be used in conjunction with the preferentially energy sensitive detectors.

Neutron Source

Associated Particle Imager Neutron Source

Figure 4:
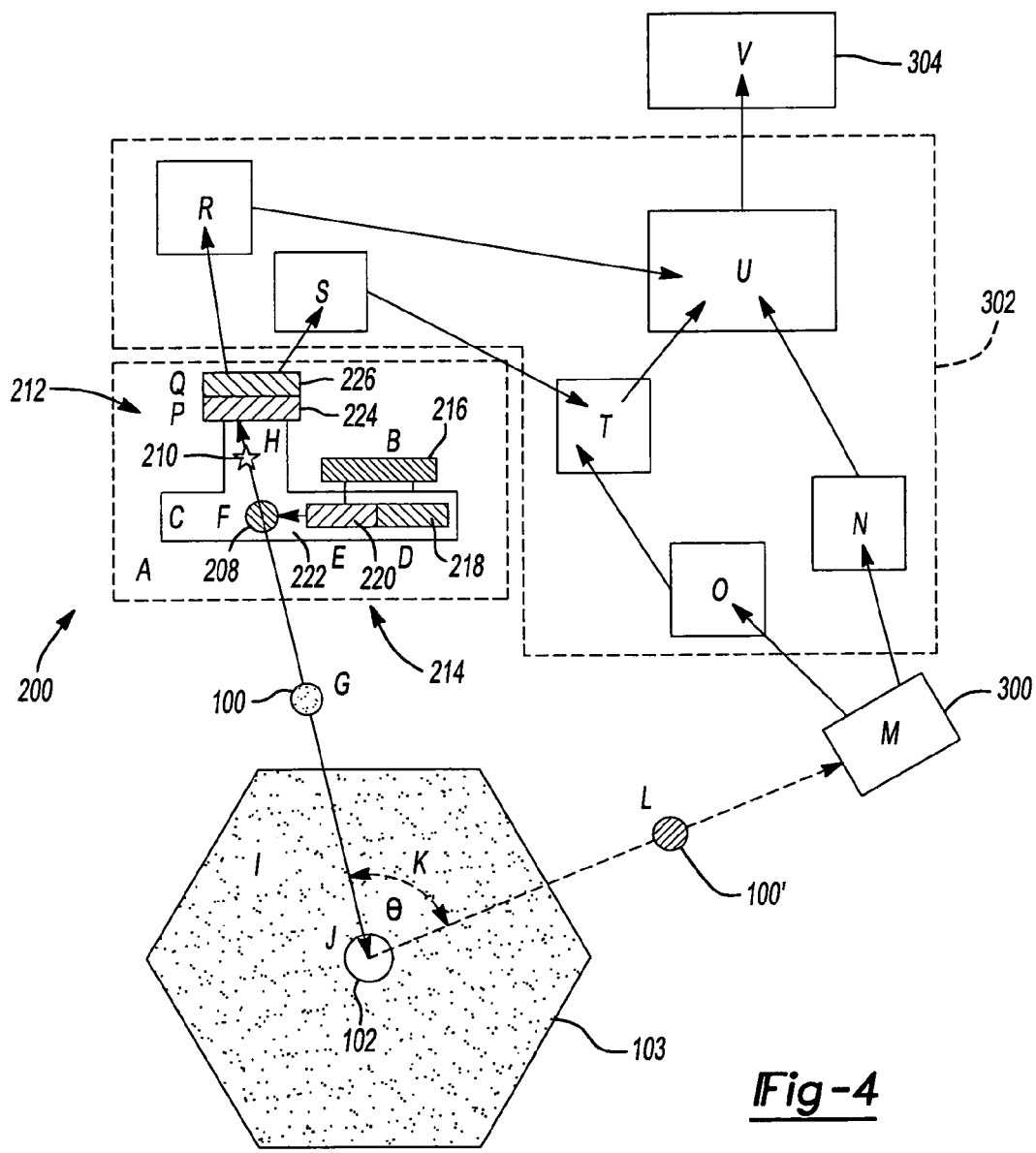
FIG. 4 is a schematic view illustrating a neutron elastic scattering detector device according to some embodiments of the present teachings.

According to some embodiments of the present teachings, neutron source 200 can be a plasma-based, associated particle imager neutron source 214 (see FIGS. 3(a) and 4). In such embodiments, as illustrated in FIG. 3, a plasma 204 having deuterium ions (D+), is generated. The deuterium ions (D+) are accelerated in response to a voltage differential, which can be applied by a voltage system 206, onto a zirconium plate 208, having tritium ions (T) implanted therein. In some embodiments, a focusing system 209 can be used to focus the deuterium ions (D+) on plate 208. The resulting deuterium-tritium (D-T) nuclear (fusion) reaction generates both a baseline particle 210, in this embodiment an alpha particle, and an associated incident neutron 100. Baseline particle 210 and incident neutron 100 are created simultaneously, thereby defining a creation time, and are propelled in opposite directions, thereby defining incident neutron direction 104. Incident neutron 100 further defines a known energy of approximately 14 MeV. In some embodiments, both plasma 204 and plate 208 can contain deuterium ions, thereby resulting in an emitted neutron having a known energy of 2 MeV neutrons. The various components in the neutron generator tube may also be varied in composition, geometry, and other parameters to change the operations and/or output of the tube.

In order to detect baseline particle 210 and thereby determine the creation time and direction of incident neutron 100, baseline particle 210 is detected by an imaging plate 212, such as an ion detector. Example detectors such as, but not limited to, scintillation detectors and semiconductors can be used. Imaging plate 212 may consist of one or more detector elements. The impact location of baseline particle 210 on imaging plate 212 and its arrival time are thus measured by imaging plate 212. Consequently, based on such impact location, the known distance between the source reaction nuclei in plate 208, and the known speed of baseline particle 210, the creation time (also known as emission time) of baseline particle 210 and incident neutron 100 can be determined through mathematical computation. Similarly, according to conservation of momentum principles, the direction 104 of incident neutron 100 can also be determined. Therefore, the high energy neutrons, namely incident neutrons 100, from these reactions depart neutron source 200 in known directions, at known times, and with a known energy. The incident neutrons 100 constitute a pulsed beam of sufficient precision to enable computation according to neutron elastic scattering principles.

In some embodiments, as illustrated in FIG. 4, neutron source 200 can comprise a plasma-based neutron generator 214 with an associated particle imaging plate 212. A radioisotopic source with a particle imaging plate would be an alternative neutron source. In some embodiments, an accelerator could be used in which accelerated particles impinge upon neutron-generating accelerator targets which are examined for the energy and direction of emission of the other products of the resulting nuclear reactions.

Plasma-based neutron generator 214 can be controlled in response to a controller 216 having pulse control input, digital input, and/or high voltage power supply input. In some embodiments, controller 216 can comprise a user interface to permit convenient changes by a user. A high voltage supply 218 powers an ion source 220. In response thereto, ion source 220 outputs at least one deuterium ion (for most plasma-based generators), which is accelerated across a vacuum space 222 within plasma-based neutron generator 214, and impinges on plate or member 208. Plate or member 208 contains tritium previously implanted, and a D-T fusion interaction occurs. As a result of such impingement, incident neutron 100 and baseline particle 210 are produced at an emission time $T_e$. However, it should be appreciated that the present teachings can be used with other neutron generator designs having different materials in plate or member 208, which can result in the creation of different particle pairs other than a neutron and an alpha particle.

At least some of the plurality of neutrons created in accordance with the above principles will travel in the direction of object of interest 103, where they may interact with one or more target nuclei 102. An elastic interaction and/or impact between incident neutron 100 and target nucleus 102 can cause incident neutron 100 to scatter at scattering angle θ (theta). This scattered neutron 100' can travel in such a direction that it is detected by detector 300, which in turn outputs a detector signal. The detector signal can include detection information such as the measured energy of scattered neutron 100' and the measure of scattering angle θ (theta). The detection information can be amplified, shaped and/or processed using data processing/control unit 302. In some embodiments, data processing/control unit 302 can further monitor the timing of the arrival of scattered neutron 100', which, as will be discussed, can be used to determine whether scattered neutron 100' has been scattered more than once. This determination may be made using hardware or software.

As described herein, baseline particle 210 travels in a direction exactly opposite of incident neutron 100. Baseline particle 210 can, thus, provide information, such as emission time, direction, etc. In some embodiments, baseline particle 210 can impact imaging plate 212, such as a scintillator 224 and light detector 226, a semiconductor, or the like, resulting in a baseline signal directed to data processing/control unit 302. More particularly, signals relating to the position on imaging plate 212 can be amplified, shaped, and processed via data processing/control unit 302. Additionally, in some embodiments, data processing/control unit 302 can process information about the time of arrival of baseline particle 210. Time-of-arrival information for scattered neutron 100' and baseline particle 210 can be combined by data processing/control unit 302 to, at least in part, determine when to reject data, perform corrections to the data, and/or perform other functions. Furthermore, in some embodiments, information relating to the position at which baseline particle 210 struck imaging plate 212 (and thus the angle of emission of incident neutron 100 from neutron source 200), the energy of scattered neutron 100', and information about timing of baseline particle 210 and scattered neutron 100' can be routed through analog-to-digital converters and/or other electronics of data processing/control unit 302, and then passed to an optional computer and/or display device 304.

Isotopic Neutron Source

While the plasma-based neutron source 214 accelerates deuterium ions to bombard plate 208 thereby producing incident neutrons 100 by the D-T fusion reaction, it is also possible in some embodiments to use an isotopic neutron source 221 as the neutron source 220. In other words, isotopic neutron source 221 replaces plasma-based neutron generator 214, i.e. in place of plasma 204, target plate 208, focusing system 209, controller 216, high voltage supply 218, and ion source 220 as illustrated in FIG. 3(*c*).

In some of such embodiments, a radionuclide is mixed with a second material that has a high cross section for an interaction involving the emitted particle from the radionuclide and produces a neutron as one of the interaction products. Examples of such reaction pairs include, but are not limited to, Pu-239/Be, Po-210/Be, Pu-238/Be, Am-241/Be, Cm-244/Be, Ra-226/Be, Ac-227/Be, which generally operate via the (alpha, N) reaction. Isotopic neutron source 221 operates similarly to a plasma-based neutron source 214 in that it detects a recoil particle or nucleus, by means of a detector located in proximity to or mixed with the neutron-producing isotopes, to establish the direction of incident neutron 100. As is the case with plasma-based neutron source 214, the creation time of incident neutron 100 can thus be determined. Different arrangements of the two isotopes and the recoil particle or nucleus detector are possible. Such arrangements may include mixing the isotopes together with the detector, one or more thin layers of isotopes and detectors, and so on.

In some embodiments, isotopic neutron source 221 can employ a radionuclide that spontaneously emits (through processes of radioactive decay or spontaneous fission) neutrons. An example of such a source is Cf-252, which does not emit neutrons all having the same energy. By coupling such a source with a means for detecting the recoiling nucleus or other emitted particles, it is possible to determine the time at which neutrons are emitted. If a determination of the energy is made possible by a similar detection, then a source can result that produces neutron of different known energies being emitted in different directions. This is an advantageous way of determining information about object of interest 103 when bombarded with different energies of neutrons.

Accelerator Based Neutron Source

Accelerator Based Neutron Sources are capable of producing charged particles of different types having different energies. When these particles interact with materials placed in their paths (accelerator targets), nuclear reactions occur. Some of these reactions involve the production of neutrons. Careful selection of accelerator target material, bombarding particle, and bombarding particle energy can enable the production of neutrons having specific energies of interest. Combinations of materials could be made in the same accelerator target to produce different effects when bombarded with different incident particles or incident particle energies. In another embodiment, such an accelerator-based neutron source could be utilized. Imaging detectors can be coupled with the accelerator target(s) to provide information about the time, angle of emission, and/or energy of emission of the neutrons for use in neutron elastic scattering methods.

It should be understood that in some embodiments of the present teachings, accelerator neutron sources can be used as neutron source 200, i.e. in place of plasma-based neutron source 214 or isotopic neutron source 221. However, some advantages of the same can be sacrificed.

Advantages of isotopic neutron sources are that they lack complexity and the requirements for power in order to produce neutrons. Disadvantages are that they present a security risk themselves and continue to emit radiation at all times, even when not in use. Advantages of plasma- and accelerator-based neutron sources include the fact that when they are not powered no radiation hazards are present (except for some activation of parts). Accelerator-based systems offer more flexibility in terms of available energies of neutron beams, but are generally larger and more complex. Incorporation of the imaging windows into isotopic and accelerator-based neutron sources requires some special design considerations.

It should also be understood that a non-imaging particle detector can be used in place of imaging plate 212 for both the isotopic, plasma-based, and accelerator-based neutron sources. However, although timing information would still be available using a non-imaging particle detector, the emission angle of incident neutron 100 would be less precise.

Detector

While associated particle imager neutron source 200 generates neutrons in a wide range of directions, the ability to use the recoil baseline particle 210 or other associated particle to establish both emission time and direction of incident neutrons 100 permits the use of conventional electronic gating means to select those scattered neutrons 100' that, when detected by detector 300 at a particular angle and a particular time with an energy corresponding to scattering from one of the elements of interest (commonly nitrogen, carbon, oxygen or hydrogen), can be determined to have suffered only a single scattering event.

However, in such embodiments, potential complications can arise with the method if at least some multiply-scattered neutrons 100'', 100''' (see FIGS. 5-9) are detected and analyzed as if they had suffered only a single scattering. Therefore, it is often desirable to arrange neutron source 200 and detector 300 such that multiply-scattered neutrons 100'' are either not detected by detector 300 or, if detected, are removed from any resulting data set via hardware or software. In some embodiments, which will be discussed herein, detectors 300 can be shielded from multiply-scattered neutrons 100''. By changing the aim direction of either cone defined by the acceptance angles of source or detector, the position of the interrogated volume element (voxel) can be adjusted so as to scan the volume of the object of interest. Because the intensity of the neutron beam varies across its width in a known manner, additional information can be obtained by examination of the distribution of neutrons across the detector surfaces. Other potentially useful information for neutron elastic scattering analysis can be obtained because neutrons scatter preferentially at different angles form different types of nuclei. Sampling or scanning the neutron beam across one or more detector surfaces would provide such information.

Data Processing/Control Unit

In some embodiments of the present teachings, interrogation of object of interest 103 can involve the detection of scattered neutrons 100' at one or multiple angles by one or more detectors 300. Because neutrons scattered by nuclei of different isotopes have different energies, the resultant scattered neutrons 100' can travel at different velocities. As should be appreciated, these different velocities affect the time of flight of each scattered neutron 100' arriving at detector(s) 300 relative to each other. If not corrected for, interpretation of the resulting signals from detector(s) 300 will be uncertain since, for example, a neutron scattered from a nucleus near the surface of object of interest 103 can be overtaken by a neutron scattered more deeply in object of interest 103 but that has lost less energy during its scattering process. The temporal pattern of neutrons arriving at detector 300, or the resulting maps of composition versus distance which would arise from such interrogation methods would be flawed unless correction for this phenomenon is performed.

Therefore, if the energy of scattered neutrons 100' is determined using angular differences, a spectroscopic detector, or other means, then a correction is possible for temporal patterns and amplitudes versus depth measurements using timed pulsed neutron scattering. Such corrections can become more important as the distance between target nucleus 102 within object of interest 103 and detector 300 increases (allowing more time for faster nuclei to overtake slower ones), the size of object of interest 103 increases, the struck nucleus within object of interest 103 is smaller (the amount of energy change with scattering is greater for lower mass number nuclei), or the scattering angle θ (theta) increases (for which the differences in scattered energy will be greater for different nuclei).

If multiply-scattered neutrons can be effectively removed through other methods, such as the shields discussed below, with the appropriate correction for this and/or other effects, the times of arrival of neutrons at the detector would contain not only information about the nucleus with which the neutron scattered, but also about the distance of that nucleus from the detector. This would greatly enhance the ability to image the composition or related parameter of the object of interest.

Multiple Scattering

When neutrons are emitted from a source and interact elastically in an object, they can scatter once or multiple times. When these neutrons scatter once and are detected, measurement of their scattered trajectory and angle allow identification of the nucleus from which they scattered. However, if they scatter multiple times, they change angles repeatedly and lose energy, but can, nevertheless, end up traveling at such an angle that they will reach the detector that they would have reached if they had only scattered once in the medium. If the energy (or time-of-flight information based on the timing of a pulsed source) of the scattered neutron arriving at a fixed detector is used to determine the isotopic composition based on the assumption that it underwent a single scattering, it can be mistaken for a neutron scattering multiple times from other materials at a different (perhaps closer) locations. The larger the neutron source, detector, and scattering medium, the greater this effect will be. Therefore, it is desirable to minimize this effect through the use of hardware, software, shielding, and the like.

Hardware/Software Solutions

For very large objects of interest for which it is difficult to restrict the field-of-view of the detector relative to the portion of an object stimulated by the neutron source, the arrival time, detected neutron energy, and detector angle information can be combined to provide positional information. That is, if the neutron energy indicates that the neutron should have arrived sooner than it did, the neutron must have traveled further than the anticipated location of the target nucleus. If the neutron energy indicates that the neutron should have arrived later than it did, then the neutron must have traveled further than the anticipated location of the target nucleus. This information can be used, either by hardware and/or software, to eliminate this data point from the overall date set.

Shielding Solutions

In place of or in addition to the usage of the directional information and timing information discussed herein, shielding can be used to limit the size of the neutron beam emerging from neutron source 200 and/or the field of view of detector 300. However, it should be appreciated that neutron shielding is somewhat complex in that different materials are needed to stop higher and lower energy neutrons (e.g. fast and thermal neutrons), and many more types of interactions with various shielding materials are possible, including interactions which produce penetrating photons (gamma rays or x-rays): Therefore, in some embodiments, to reliably stop and/or shield neutrons with energies above thermal, such neutrons must first be slowed down or moderated. In some embodiments, this can be accomplished using low atomic number (lighter) elements as the shielding material. The optimal choice for neutron moderation is hydrogen, therefore water and/or paraffin provide advantageous results.

Once the neutron energy has been reduced to near thermal, materials which, because of their nuclear characteristics, have especially high probabilities of absorbing these slower neutrons can be used. In some embodiments, such materials can include for example He-3, Li-6, and B-10. However, absorption of neutrons in some materials can result in the production of gamma rays that can cause interference with neutron detection and also present an additional radiation hazard. Therefore, in some embodiments, shielding should be provided against gamma rays when necessary.

Accordingly, in some embodiments of the present teachings, shielding materials can be used in connection with neutron source 200 and/or detector 300 to restrict or otherwise narrow the field of neutron emissions from neutron source 200 or neutron detection by detector 300. That is, for shielding applied to neutron source 200, the effective region of object of interest 103 being bombarded by incident neutrons 100 can be limited, thereby resulting in fewer multiply-scattered neutrons 100" reaching detector 300. Similarly, for shielding applied to detector 300, the angles from which scattered neutrons 100', 100", and 100'" (see FIGS. 5-9) can enter detector 300 is reduced, thereby limiting the area being effectively examined for singly scattered neutrons 100' and reducing the number of multiply-scattered neutrons 100" able to reach detector 300.

According to the present teachings, it should be appreciated that the particular design and selection of materials for use in shielding neutron source 200 and/or detector 300 is dependent upon the desired application. For example, in some embodiments, the neutron moderator and neutron absorber can be separated, combined into a single region, or used both ways in the same design. Openings, having right angles or tapered sides, can be used to allow neutrons to escape from neutron source 200 or enter detector 300. Materials can be placed in these openings to change the energy of the neutrons, or to stop undesired neutrons or photons from reaching detector 300. Structures of different materials could also be placed within the shields. Still further, in some embodiments, materials that do not produce penetrating secondary radiation can be used as the moderator and/or thermal neutron absorber, eliminating the need for the photon absorbing portion of the shield design. Neutron source 200 and detector 300 could also be combined in to a single system with collimation in such a way that different materials are organized to serve both the purposes of limiting the angle of emission of incident neutrons 100 and restricting the angular sensitivity (field-of-view) of detector 300.

Detector Shielding

Figure 5:
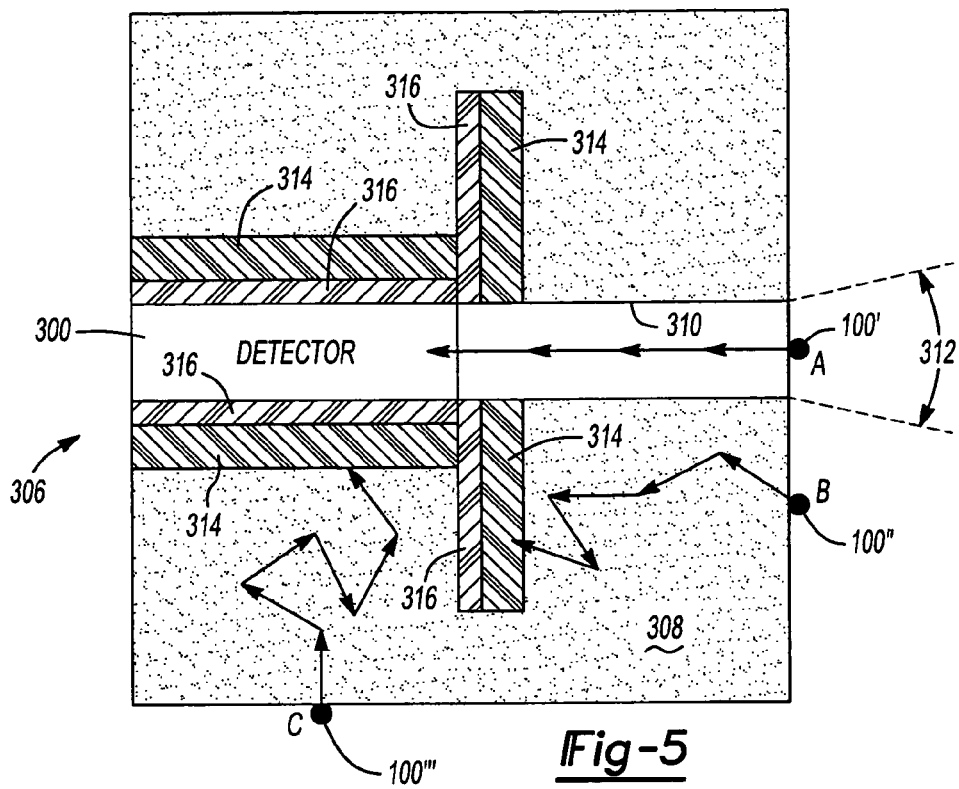
FIG. 5 is a schematic view illustrating a detector shielding system according to some embodiments of the present teachings.
Figure 6:
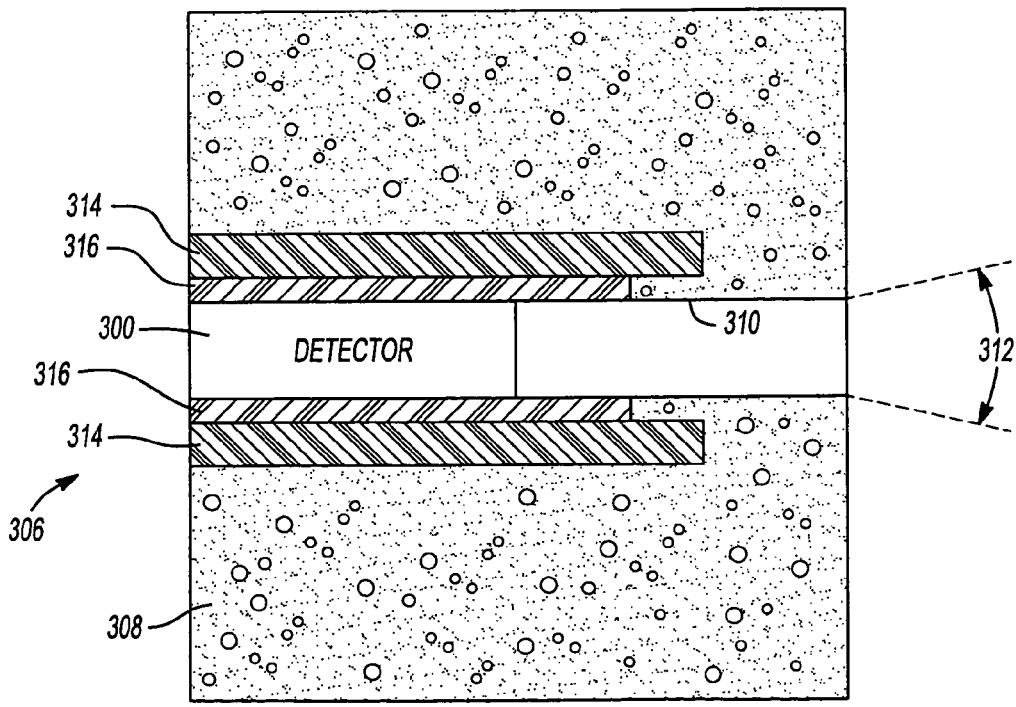
FIG. 6 is a schematic view illustrating a detector shielding system according to some embodiments of the present teachings.

As illustrated in FIG. 5, detector 300 can comprise a detector shielding system 306 for shielding multiply-scattered neutrons 100', 100", and 100'". In some embodiments, detector shielding system 306 can comprise a first material portion 308 being a low-Z material that thermalizes (moderates) scattered neutrons 100', 100", and 100'" passing therethrough. Because hydrogen is so effective at slowing down fast neutrons, hydrogenous materials such as paraffin or water are a good choice for use as first material portion 308. An on-axis opening 310 extends through first material portion 308 to define a field of view or viewing direction 312 of which scattered neutrons 100' can pass to detector 300 without passing through first material portion 308. Note that scattered neutron 100" could pass uninteracted into detector 300 if it were not for the presence of first material portion 308. Scattered neutron 100'" has no opportunity to enter the detector 300 without the possibility of interacting with first material portion 308. Detector shielding system 306 can also comprise a second material portion 314, being a high thermal cross section material, i.e. a material with a high probability of completely absorbing lower energy neutrons. Second material 314 can be separated from detector 300 by a third material portion 316, being a high-Z material. Third material portion 316 can be used to capture photons resulting from nuclear reactions in second material portion 314, from first material portion 308, and/or from other materials in the nearby environment, thus preventing them from interacting with detector 300. Materials 308, 314, and 316 could also be placed on the side of the detector that is facing away from the neutron source. As illustrated, detector shielding system 306 can be extended to surround and protect detector 300 from most scattered neutrons 100", 100'" coming from all non-axial and reverse axis directions (i.e. directions other than viewing direction 312). It should be appreciated that detector shielding system 306 can include a reduced number of materials, alternate material(s), or differing configurations, such as illustrated in FIG. 6.

In some embodiments, shields can be disposed within openings of the detector to change the preferential or absolute energy sensitivity of the detector. First material portion 308 may be combined with second material portion 314. The third material portion 316 may not be necessary if careful selections of material portions 308 and 314 are made. In some embodiments, an additional layer of material similar to that in material portion 316 may be placed furthest from the detector in order to stop all photons (gamma rays and x-rays) coming from the environment outside of the detector shield.

From the foregoing, it should also be appreciated that outermost portion of detector shielding system 306 furthest from detector 300, namely first material portion 308, can be made of a material best at slowing down (moderating) neutrons. Disposed within first material portion 308 and, thus, downstream relative to the travel of scattered neutrons 100', 100", and 100'" is second material portion 314 that can be made of a material best at absorbing the neutrons that have been slowed down in the first material portion 308. Lastly, disposed further downstream relative to second material portion 314 is third material portion 316, which can be made of a high atomic number and density material best for absorbing gamma ray and x-ray radiation either produced from within detector shielding system 306 as a result of the interactions of scattered neutrons 100" and 100'", or from other sources outside the shield. Photons may be distinguished from neutrons by some detectors using circuitry and/or software, but because neutrons do not interact well with high atomic number materials in general including these in the design could be advantageous.

Neutron Source Shielding

Figure 7:
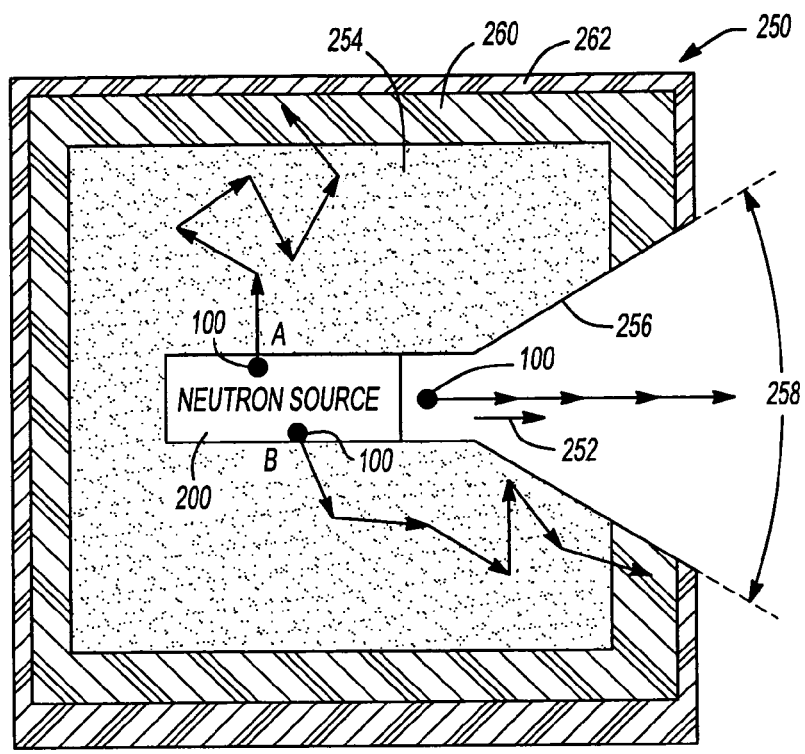
FIG. 7 is a schematic view illustrating a neutron source shielding system according to some embodiments of the present teachings.
Figure 8:
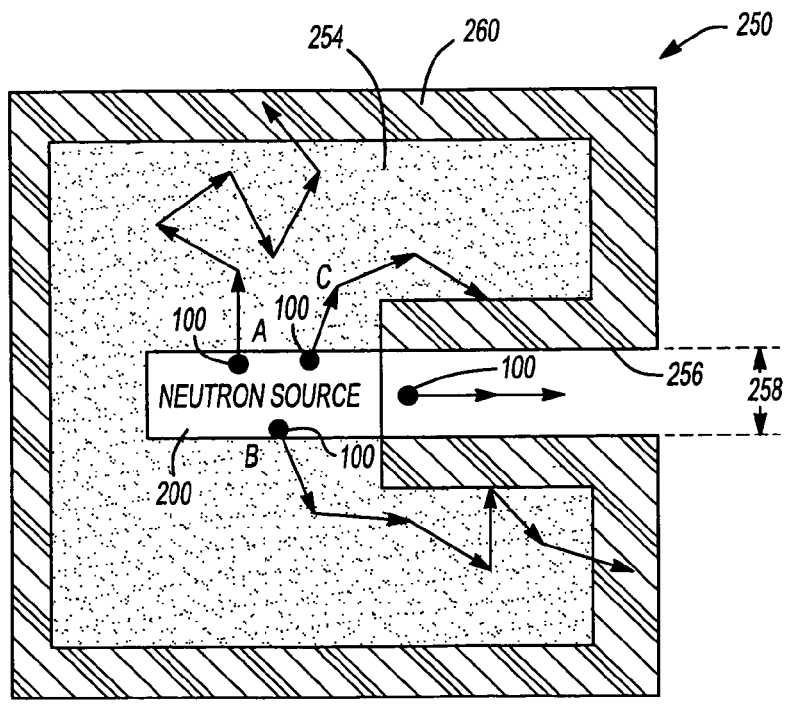
FIG. 8 is a schematic view illustrating a neutron source shielding system according to some embodiments of the present teachings.
Figure 9:
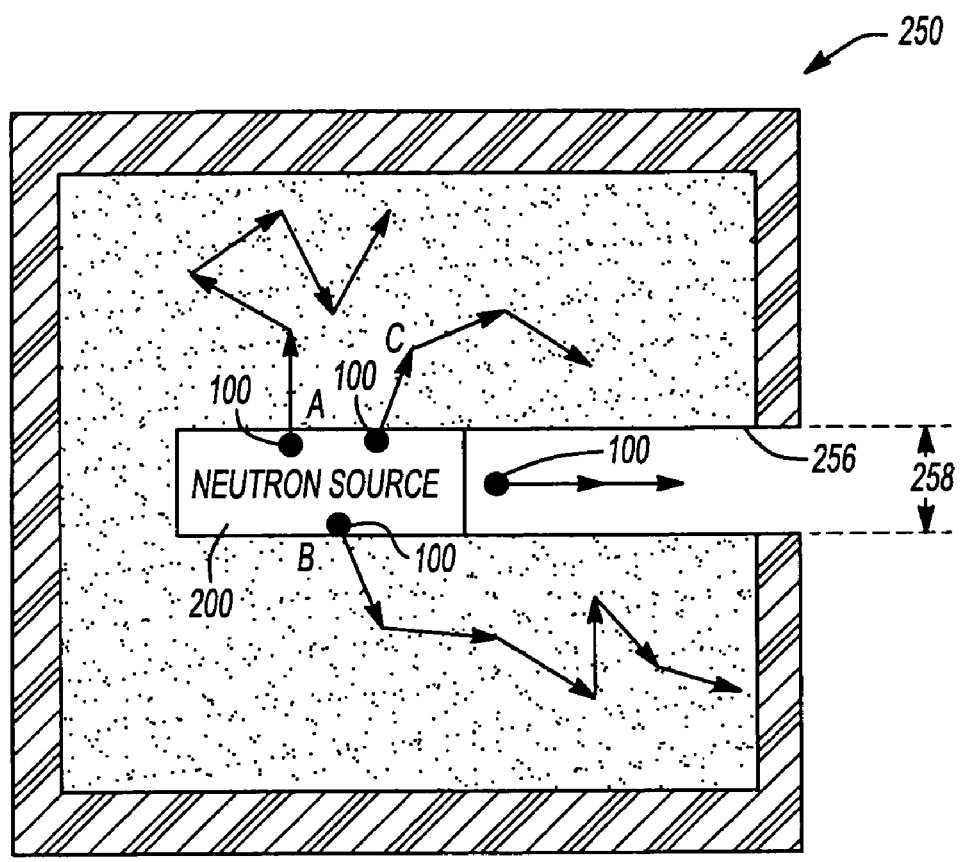
FIG. 9 is a schematic view illustrating a neutron source shielding system according to some embodiments of the present teachings.

With reference to FIGS. 7-9, in some embodiments, neutron source 200 can comprise a neutron source shielding system 250 for shielding incident neutrons 100 emitted in a direction other than a preferred beam direction 252. In some embodiments, neutron source shielding system 250 can comprise a moderator or first material portion 254 being a low-Z material (i.e. low atomic number material) that thermalizes (moderate) incident neutrons 100 passing therethrough. An on-axis opening 256 extends through first material portion 254 to define a neutron beam emission field 258 of which incident neutrons 100 can pass to object of interest 103 without passing through first material portion 254. Once slowed down in first material portion 254, off-axis neutrons can now be more readily absorbed by special materials having a high thermal neutron absorption probability. A second material portion 260 is thus added in order to stop these neutrons. Because the neutron/shield nuclear interactions can produce photons (gammas or X-rays), neutron source shielding system 250 can also comprise an absorbing layer or third material portion 262, being a high-Z material to absorb the photons which otherwise might reach object of interest 103 or personnel in the vicinity of the source. As illustrated, neutron source shielding system 250 can be extended to surround and contain neutron source 200 to prevent emission of incident neutrons 100 in any direction other than preferred beam direction 252. It should be appreciated that neutron source shielding system 250 can include a reduced number of materials, alternate material, or differing configurations, such as illustrated in FIGS. 8 and 9 and similar to the embodiments described in connection with detector shielding system 306. One particular benefit of neutron source shielding system 250 is that in addition to improving the data that can be acquired for neutron elastic scattering measurements, the shield provides protection for personnel standing near the neutron source, and can also reduce the amount of activation of materials within the source vicinity.

Alternative Uses

Combination of Different Signal Types Arising from Object Bombardment with Neutrons In addition to the neutron irradiative analysis methods described herein, the bombardment of object of interest 103 with neutrons can also result in signals that can be used for measurement methods other than neutron elastic scattering, such as gated thermal neutron activation analysis, fast neutron analysis, pulsed fast neutron analysis, neutron resonance attenuation, neutron inelastic scattering, and others. Other ionizing radiation based measurement methods can include photon attenuation, photon resonance attenuation, photon (Compton) scattering, multi-energy photon transmission measurements, photonuclear activation, high energy electron attenuation, high energy electron activation or scattering, and others.

With most neutron irradiative analysis methods, the signal arising from only one particular neutron interaction process is utilized, although the signal needed for the other methods may be present. For example, for neutron inelastic scattering, only detected gamma rays having a specific characteristic energy are used for the analysis. The remaining information about object of interest 103 carried in the elastically scattered neutrons 100' is often ignored.

For each measurement method, it is desirable to make use of nearly all of the information from the neutron irradiative process to maximize the chance of obtaining reliable results and provide additional range/versatility of scanning. For example, information about neutrons scattered during the use of neutron elastic scattering detector device 10 can be combined with measurements of gamma rays emitted from object of interest 103 as a result of neutron activation. Combination of this information would result in improved sensitivity and specificity without the need for bombarding with a greater number of neutrons since information is obtained from a larger fraction of the source neutrons. More efficient use of the neutron source flux allows lower intensity and thus reduces activation of items the neutron beam encounters (such as metals), thereby reducing both the radiation hazard presented by the procedure (helping to reduce or eliminate personnel shielding and/or standoff distance required between personnel and the measurement process) and the total measurement time.

In some embodiments, signals for a given measurement system can simply be collected at a given angle, at a given neutron energy, or with other limitations. Adding detectors of different types at different angles and using spectroscopic detectors, would result in the availability of data containing more information about object of interest 103. In some embodiments, using different stimulating radiations, such as electrons or other particles and photons (gamma rays and X-rays) would also provide additional information about object of interest 103 of a different type.

In some embodiments, a major portion of the signal to be collected is the neutron spectrum, i.e. the number of neutrons of a particular energy at a given location. Because several of the neutron interactions in materials produce photons (gamma rays and x-rays), the photon spectrum can also be collected whenever neutron bombardment occurs. These photons can be emitted immediately, but may also be delayed (when the neutrons induce radioactivity in object of interest 103, resulting in the emission of photons some time after the bombardment). Additionally, in some embodiments, detection of gamma rays emitted as a function of time also can represent a potentially useful signal for object characterization since the half-life (decay probability, or amount of time it takes for the signal to decrease to one half of its original intensity) of a given radionuclide is very characteristic of that radionuclide, and thus the target nucleus which was activated.

In some embodiments, the neutron and photon spectrum collected at different angles can contain different information. One reason for this is that the probability of scattering from a given atomic number nucleus varies as a function of angle, and these probabilities vary differently for different atomic number nuclei. In addition, detectors directly opposite the source can provide information about neutron transmission when the neutrons having energies equivalent to their incident energy are considered. The portions of the spectra which are not peaks reveal information about scattering of photons or neutrons from object of interest 103, and are useful for determining the physical density and composition of object of interest 103 when collected at different angles and compared.

If different energies of neutrons are used, different probabilities of interaction processes occur. In addition, some neutron interactions have thresholds below which they cannot occur. Thus, if bombardments are made at different energies, additional information about object of interest 103 can be obtained.

In some embodiments, the geometry of neutron source 200 and detector arrangement can have an influence on the data obtained. For example, changing the distance between neutron source 200 and object of interest 103, or the detector and object of interest 103, will change the signals. Usage of different geometries of shields (which can be varied), or movements of detectors, sources, and/or their shields will produce more data, including positional information. Data can be collected with variations in these properties, and the resultant data can be used for analysis.

One method of combining the signals is to extract features from the recorded data that correspond to specific physical processes. For example, gamma rays emitted from activation interactions have energies that are characteristic of the target nucleus which produced them. One could thus extract the number of unscattered gamma rays of that energy that are observed at a given angle. The relative number at different angles gives information about the distribution of that particular target nucleus throughout object of interest 103. In the rest of the gamma spectrum, there will be information about how these gamma rays scattered in object of interest 103, which is another signal feature that can be analyzed. Gamma rays from inelastic scattering interactions could similarly be used. In the neutron spectrum, there will be peaks corresponding to elastic neutron scattering from specific nuclides that can be used. Even multiply-scattered neutrons contain some information, since they reveal more about the density and composition of object of interest 103.

The probability of scattering from one type of nucleus varies as a function of angle, and varies in a different way for other nuclei. Similarly, this probability varies as a function of bombarding neutron energy in a different way for different nuclei. The collection of neutron elastic scattering information can be performed and analyzed by varying and/or combining information in order to optimize the measurement method. In addition, geometry factors such as target-to-detector distances, can be adjusted for optimal performance and collection of more useful data. There are a variety of ways of altering the incident neutron source energy, including, by non-limiting example, the use of an accelerator with different targets, use of different radionuclide neutron sources, different neutron generator types, or moderation.

Further information can be obtained by bombarding object of interest 103 with photons (x-rays or gamma rays) of different energies from different angles. The scatter components of these interactions contain information about target nucleus 102. Insofar as these methods are combined with neutron elastic scattering detector device 10, they are believed to be part of the present teachings.

Ratios of one peak to another, or even from one region of the spectrum to another, which are not readily and clearly identifiable as the result of specific processes, can still provide characteristic information about chemical composition and the density of object of interest 103. Information from multiple spectra (photons and neutrons at different angles) could also be analyzed in this way, or divided, multiplied, added, subtracted, and/or otherwise mathematically combined in pairs or larger combinations. An algorithm could be developed that compares several parameters or ratios/other mathematical combinations of one or more parameters. This could include establishment of a decision tree requiring a comparison of different parameters, and so on, until a final result of explosive/narcotic, present/not present, etc. is reached. Information of potential use can thus not be restricted to only specific metrics for certain physical processes. If neutron and gamma ray spectra are collected at different angles, neutron source energies, and delay times (post-irradiation), a very large amount of information is available and salient features can be missed if analysis is limited to a single process. Under such circumstances or using subsets of these data, different methods of combining the information would be appropriate. The combinations of data can be made in software or hardware developed for that purpose. The analysis can yield chemical composition, a present/not present flag for explosives and/or narcotics, or other properties such as, for example but not limited to chemical inhomogeneity, target density, and the like.

Some examples of useful signal combinations include by non-limited example: a) ratios of spectral peaks or portions of spectra corresponding to different isotopes; b) ratios of neutron and gamma ray data; c) decision trees using different signals, d) comparison of signals with a known database, e) training neural networks, and f) use of data mining techniques, and g) comparison with experiments or simulations.

Several methods of collecting (hardware) or correcting (software) the data to improve its utility are possible according to the principles of the present teachings. For example, scatter can be estimated using computer simulations and a scatter correction applied. Data contained within the spectra themselves can also be used. Blurring functions can be used to correct images (if obtained). Target recognition software can be utilized to detect abnormalities. Lookup tables or empirical formulae can be derived, for a variety of targets and surrounding media size, composition, densities, and geometries, and used in the analysis. Hardware rejection of signals that are not useful can also be possible. Neutron absorption and scattering (a function of both density and composition) will tend to confound information, but this can be corrected for if transmission and scattering data are carefully analyzed.

If information at appropriate angles is obtained, through relative motion of the neutron source and detector and the object of interest and/or use of multiple sources and/or detectors, imaging of the composition, determination of the probability of containing explosives/narcotics, or another property in object of interest 103 would be possible. The resulting images could serve as maps of chemical composition, or pinpoint regions of abnormality. A variety of image analyses and image processing methods can be used with the data from such a system. Imaging, especially when this combines one or more types of information, could enhance the sensitivity and/or specificity of the measurement system.

Hybrid Measurement Systems

In some embodiments, the detector and its accompanying electronics can be designed specifically for a particular application. Pulse height analysis to determine neutron energy can be used to reject undesired radiation such as would occur for example from multiple scattering. This can be accomplished by the use of lower and upper energy level discriminators and pulse shape analysis on the detector outputs to reject radiation of undesired energies, or to distinguish different types of radiation (e.g. photons from neutrons). Multichannel collection of energy information could also be used in other embodiments of this device, with software processing signals after data collection is complete. Alternatively, time-of-flight hardware can be specifically designed for a given application. In this case, corrections to the various aspects of determining the time-of-flight of the neutrons can be accomplished either using hardware or implemented in software. As discussed above, detectors can be inherently sensitive in only one direction or arranged to be so using shielding methods of this invention, or multiple types of detectors that are preferentially sensitive to different types or energies of radiation can be used.

In order to collect the maximum possible useful data of different types, including by non-limiting example time of flight, spectroscopic, directional, of photons or neutrons, for analysis, different irradiative interrogation methods can be incorporated into a single system. This can increase throughput, sensitivity, and specificity for detecting unknowns. This can also involve substantial cost savings when compared with having separate systems operating under different principles. One or more detectors, neutron sources, and photon or other radiation sources can be organized into the design in separate or single blocks. In integrated systems, care must be taken in the placement of neutron and gamma ray sources and their shielding relative to neutron and gamma ray detectors. For imaging interrogation, detectors must be arranged to assure appropriate sampling of object of interest 103. Because a properly designed neutron elastic scattering system provides depth information using, for example, oriented collimators and detectors, a system capable of imaging in three-dimension can be designed.

System designs can differ depending upon the application. Large stationary systems capable of stimulating object of interest 103 and capturing the resulting data from a number of different neutron and photon interaction processes are possible. These can include other types of radiation sources and/or other measurement modalities. In particular, compact systems can be developed for other applications and for all systems, variations in the detector, source, and object of interest distances and orientations can be used to yield additional information. The design of shields that automatically view object of interest 103 preferentially in three-dimensional volume elements (voxels) is possible with proper choice of shield openings and angulations, as well as staggering of these openings and angulations into different layers. The combination of neutron source and detectors into a single package, in which the shielding designs discussed above are carefully implemented so that moderators, thermal neutron absorbers, and photon absorbers are arranged in an appropriately concentric fashion would enable particularly compact system designs capable of measuring backscatter. One portion of shielding material could be moderating neutrons entering from the outside to stop them from reaching the detector, while slowing neutrons from the neutron source. Shield layers for stopping thermal neutrons and absorbing photons could be similarly arranged. Alternatively, several of these systems could be used in combination to look at object of interest 103 from different angles. The neutron detectors from one module could observe scattered neutrons which originated from the neutron sources in several other modules, including the source within their own module.

A compact neutron irradiative system can be deployed on an aircraft or motor vehicle. The design for such a system should be such to protect personnel and expensive equipment both from radiation hazards arising from the system itself as well as from interactions with explosives such as improvised explosive devices or landmines or other ground-based hazards. In one approach, neutron source 200 can be suspended near the earth, and the detector more elevated with the craft. Alternatively, a source-detector module can be lowered to the earth. Aircraft can be fitted with built-in mechanisms for lowering neutron source 200 or source-detector package. Similar system designs are possible for land-based motor vehicles and watercraft.

The invention claimed is:

1. A neutron elastic scattering detector device for non-invasively detecting the presence of at least one predetermined element of an object of interest, said detector device comprising:

a neutron source simultaneously outputting at a creation time and a creation location a first neutron having a first energy, a second neutron having a second energy, and a baseline particle, said first energy being different from said second energy, said first neutron being output in a first direction and said baseline particle being output in a second direction, said first direction being opposite of said second direction, at least said first neutron impinging upon the at least one predetermined element of the object of interest and consequently scattering therefrom in a third direction;

a baseline particle detector system detecting said baseline particle and outputting a baseline signal in response thereto;

a neutron detector system detecting at least said first neutron and outputting a scattering signal in response thereto; and a processing unit in communication with said baseline particle detector system for receiving said baseline signal and said neutron detector system for receiving said scattering signal, said processing unit analyzing said baseline signal and said scattering signal to detect the presence of the at least one predetermined element.

2. The detector device according to claim 1 wherein said processing unit analyzes said baseline signal to determine at least one of said creation time and said second direction.

3. The detector device according to claim 1 wherein said processing unit analyzes said scattering signal to determine at least one of said third direction and a resultant energy of said neutron.

4. The detector device according to claim 1 wherein said neutron detector system is a spectroscopic neutron detector system.

5. The detector device according to claim 1 wherein said baseline particle comprises a baseline particle velocity, said baseline signal comprises arrival time data when said baseline particle arrived at said baseline particle detector system, and said processing unit determines said creation time by computing a travel time of said baseline particle based on said arrival time data, said baseline particle velocity, and a known distance between said creation location and said baseline particle detector system.

6. The detector device according to claim 1 wherein said baseline signal comprises baseline arrival location data, and said processing unit determines said second direction by computing a direction vector between said creation location and said baseline arrival location data, said processing unit further determines said first direction in response to said second direction.

7. The detector device according to claim 1 wherein said first neutron comprises known neutron velocity, said scattering signal comprises neutron arrival location data, neutron arrival time data, and neutron arrival energy data, and said processing unit determines a total time of flight of said first neutron based on said neutron arrival time data and said creation time, said processing unit further determines a distance traveled by said first neutron based on said known neutron velocity and said total time of flight, said processing unit determines said chemical composition of the at least one predetermined element based on at least one set of said neutron arrival energy data and said third direction.

8. The detector device according to claim 1 wherein said neutron source is chosen from the group consisting essentially of a plasma-based neutron generator, an isotopic neutron source, radioactive decay neutron source, and an accelerator based neutron source.

9. The detector device according to claim 1 wherein said baseline particle is an alpha particle.

10. A neutron elastic scattering detector device for non-invasively detecting the presence of at least one predetermined element of an object of interest, said detector device comprising:

a neutron source simultaneously outputting at a creation time and a creation location a neutron in a first direction and an associated baseline particle in a second direction, said first direction being opposite of said second direction, said neutron impinging upon the at least one predetermined element of the object of interest and consequently scattering therefrom in a third direction, said neutron comprises known neutron velocity;

a baseline particle detector system detecting said baseline particle and outputting a baseline signal in response thereto;

a neutron detector system detecting said neutron and outputting a scattering signal in response thereto, said scattering signal comprises neutron arrival time data; and a processing unit in communication with said baseline particle detector system for receiving said baseline signal and said neutron detector system for receiving said scattering signal, said processing unit analyzing said baseline signal and said scattering signal to detect the presence of the at least one predetermined element, said processing unit determines whether said neutron has undergone more than one scattering event based on at least one of said neutron arrival time data and said third direction.

11. The detector device according to claim 10 wherein
said processing unit compares said neutron arrival time data to a predetermine range limit to determine whether to reject such data.

12. The detector device according to claim 11 wherein said predetermined range limit comprises arrival time data necessary for said neutron to scatter from light element isotopes chosen from the group consisting essentially of nitrogen, carbon, oxygen, hydrogen, lithium, potassium, and sodium.

13. The detector device according to claim 11 wherein said predetermined range limit comprises arrival time data necessary for said neutron to scatter from heavy element isotopes chosen from the group consisting essentially of uranium, plutonium, lead, and tungsten.

14. A method of non-invasively detecting the presence of at least one predetermined element of an object of interest, said method comprising:
simultaneously creating a neutron traveling in a first direction and an associated baseline particle traveling in a second direction at a creation time and at a creation location, said first direction being opposite of said second direction;
detecting arrival of said baseline particle and outputting a baseline signal in response thereto;
impinging said neutron upon the at least one predetermined element of the object of interest causing said neutron to scatter therefrom in a third direction;
detecting arrival of said neutron and outputting a scattering signal in response thereto having neutron arrival time data;
analyzing said baseline signal and said scattering signal to detect the presence of the at least one predetermined element; and
determining whether said neutron has undergone more than one scattering event based on at least one of said neutron arrival time data and said third direction.

15. The method according to claim 14, further comprising:
analyzing said baseline signal to determine at least one of said creation time and said second direction.

16. The method according to claim 14, further comprising:
analyzing said scattering signal to determine at least one of said third direction and a resultant energy of said neutron.

17. The method according to claim 14 wherein said simultaneously creating a neutron traveling in said first direction and said associated baseline particle traveling in said second direction comprises simultaneously creating a neutron traveling in a first direction and an alpha particle traveling in a second direction as a result of a deuterium-tritium nuclear reaction.

18. The method according to claim 14 wherein said detecting arrival of said baseline particle and outputting said baseline signal in response thereto comprises detecting arrival of said baseline particle and outputting a baseline signal in response thereto having arrival time data when said baseline particle arrived at said baseline particle detector system.

19. The method according to claim 18, further comprising:
determining said creation time by computing a travel time of said baseline particle based on said arrival time data, a known baseline particle velocity, and a known distance between said creation location and said baseline particle detector system.

20. The method according to claim 14 wherein said detecting arrival of said baseline particle and outputting said baseline signal in response thereto comprises detecting arrival of said baseline particle and outputting a baseline signal in response thereto having baseline arrival location data where said baseline particle arrived at said baseline particle detector system.

21. The method according to claim 20, further comprising:
determining said second direction by computing a direction vector between said creation location and said baseline arrival location data; and
determining said first direction in response to said second direction.

22. The method according to claim 14 wherein said detecting arrival of said neutron and outputting said scattering signal in response thereto comprises detecting arrival of said neutron and outputting said scattering signal in response thereto having at least one of neutron arrival location data, neutron arrival time data, and neutron arrival energy data.

23. The method according to claim 22, further comprising:
determining a total time of flight of said neutron based on said neutron arrival time data and said creation time;
determining a distance traveled by said neutron based on a known neutron velocity and said total time of flight; and
determining said chemical composition of the at least one predetermined element based on at least one set of said neutron arrival energy data and said third direction.

24. The method according to claim 14 wherein said simultaneously creating said neutron traveling in said first direction and said associated baseline particle traveling in said second direction comprises simultaneously creating at least a first neutron and a second neutron, said first neutron having a first energy and said second neutron having a second energy, said first energy being different than said second energy.

25. The method according to claim 14, further comprising:
comparing said neutron arrival time data to a predetermined range limit, said predetermined range limit being a time necessary for said neutron to scatter from light element isotopes chosen from the group consisting essentially of nitrogen, carbon, oxygen, hydrogen, lithium, potassium, and sodium.

26. The method according to claim 14, further comprising:
comparing said neutron arrival time data to a predetermined range limit, said predetermined range limit being a time necessary for said neutron to scatter from heavy element isotopes chosen from the group consisting essentially of uranium, plutonium, lead, and tungsten.

27. A method of non-invasively detecting the presence of at least one predetermined element of an object of interest, said method comprising:
simultaneously creating a first neutron having a first energy traveling in a first direction, a second neutron having a second energy different than said first energy, and an associated baseline particle traveling in a second direction at a creation time and at a creation location, said first direction being opposite of said second direction;
detecting arrival of said baseline particle and outputting a baseline signal in response thereto;
impinging said first neutron upon the at least one predetermined element of the object of interest causing said first neutron to scatter therefrom in a third direction;
detecting arrival of said first neutron and outputting a scattering signal in response thereto;
analyzing said baseline signal to determine said creation time, said second direction, and consequently said first direction;
analyzing said scattering signal to determine said third direction and a resultant energy of said first neutron; and
determining information of interest based on said analyzing said baseline signal and said scattering signal.

28. The method according to claim 27 wherein said information of interest comprises whether the at least one predetermined element is present.

29. The method according to claim 27 wherein said information of interest comprises whether the object of interest is homogenous.

30. The method according to claim 27 wherein said information of interest comprises the ratio of the at least one predetermined element to other elements in the object of interest.

* * * * *

UNITED STATES PATENT AND TRADEMARK OFFICE
CERTIFICATE OF CORRECTION

PATENT NO. : 7,405,409 B2
APPLICATION NO. : 11/357874
DATED : July 29, 2008
INVENTOR(S) : Kimberlee Jane Kearfott It is certified that error appears in the above-identified patent and that said Letters Patent is hereby corrected as shown below:

Column 5, line 7, "neuron" should be -- neutron --.

Column 5, line 36, delete "θ" and insert -- ϕ --.

Column 7, line 22, "use" should be -- used --.

Column 21, claim 11, line 3, "predetermine" should be -- predetermined --.

Signed and Sealed this

Twenty-fifth Day of November, 2008

JON W. DUDAS
*Director of the United States Patent and Trademark Office*